United States Patent [19]

Ackerman

[11] 4,398,647

[45] Aug. 16, 1983

[54] TEMPORARY MOUNTING MEANS FOR MULTIPLE OUTLET STRIP

[75] Inventor: Norman A. Ackerman, Morton Grove, Ill.

[73] Assignee: Perma Power Electronics, Inc., Chicago, Ill.

[21] Appl. No.: 258,426

[22] Filed: Apr. 28, 1981

[51] Int. Cl.³ .......................... H05K 5/00; H02G 3/08
[52] U.S. Cl. ...................................... 220/3.9; 174/58; 361/427; 248/DIG. 6; 248/221.1; 220/18; 339/125 R
[58] Field of Search ............ 248/DIG. 6, 27.1, 222.1, 248/222.4, 223.2; 174/48, 58; 361/331, 346, 356, 358, 359, 417, 419, 427; 220/18, 3.3, 3.6, 3.9; 312/245; 211/87; 339/125 R

[56] References Cited

U.S. PATENT DOCUMENTS

| | | | |
|---|---|---|---|
| 2,053,119 | 9/1936 | Sturtevant | 248/223.2 |
| 2,063,923 | 12/1936 | Gries | 220/3.6 |
| 2,299,696 | 10/1942 | Gregersen | 220/3.6 |
| 2,357,787 | 9/1944 | Windsheimer | 220/3.6 |
| 2,590,391 | 3/1952 | Elmore | 220/3.6 |
| 2,965,348 | 12/1960 | Gerstel et al. | 220/3.6 |
| 2,990,969 | 7/1961 | Carson | 220/3.6 |
| 3,319,060 | 5/1967 | Bartley | 248/222.1 |
| 3,483,434 | 12/1969 | Koertge | 361/427 |
| 3,590,137 | 6/1971 | Librandi | 174/58 |
| 3,977,640 | 8/1976 | Arnold et al. | 248/205 R |
| 4,072,401 | 2/1978 | Instone | 339/125 R |
| 4,081,057 | 3/1978 | Corradini | 248/223.2 |

FOREIGN PATENT DOCUMENTS 2810071  9/1979  Fed. Rep. of Germany ...... 361/427

Primary Examiner—G. P. Tolin
Attorney, Agent, or Firm—Hill, Van Santen, Steadman & Simpson

[57] ABSTRACT

Housings for electrical and electronic products are required in certain instances to be mounted in a temporary manner and some of such housings are required or desired to be incapable of being permanently mounted. The present invention relates to a method of mounting a housing wherein the housing can be attached to and removed from a fastener means without removing the fastener from the mounting surface of the housing or without requiring adjustment in any manner.

The present mounting means operates as a temporary mounting for a typical housing and is incorporated into means for closing the housing case and in a first mounting position is incapable of being permanently mounted. In a second alternate position, the mounting means can be utilized for permanently mounting a housing to a wall or other surface.

4 Claims, 8 Drawing Figures

U.S. Patent  Aug. 16, 1983  4,398,647
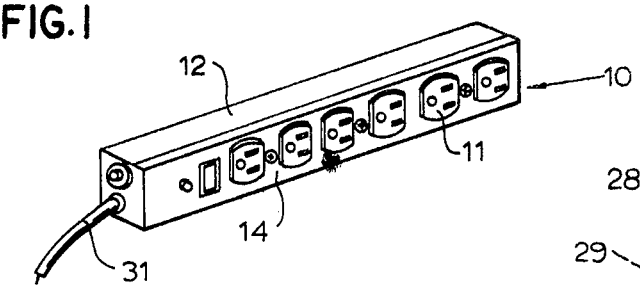
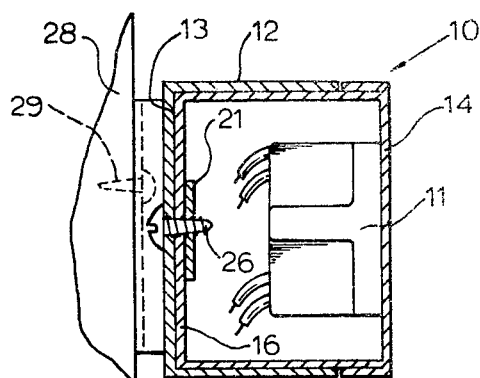
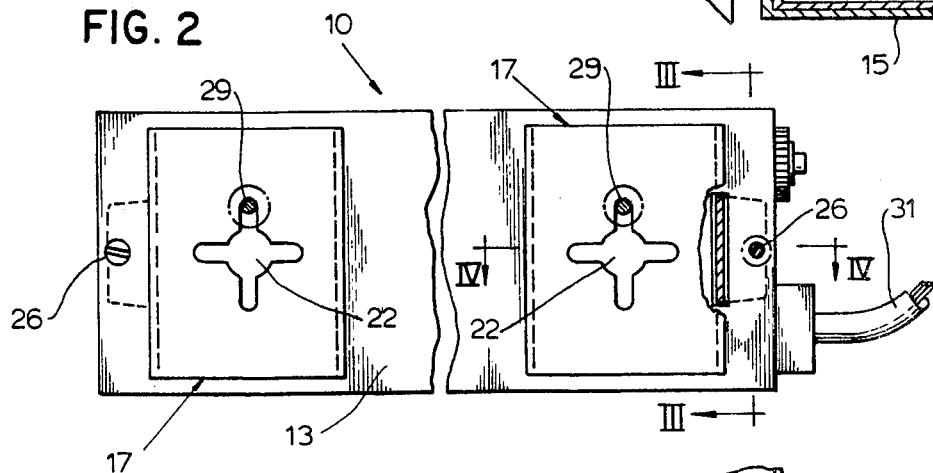
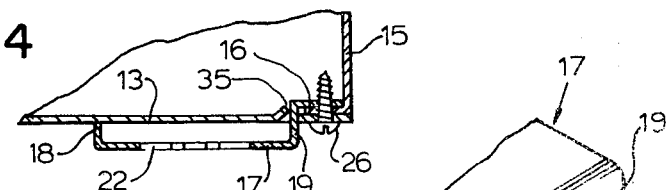
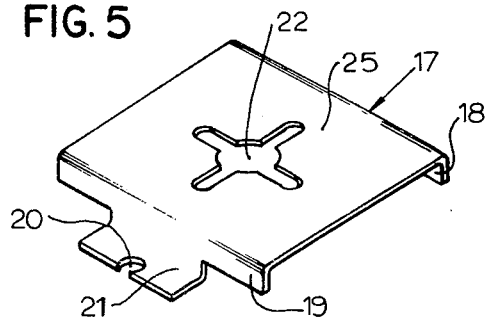
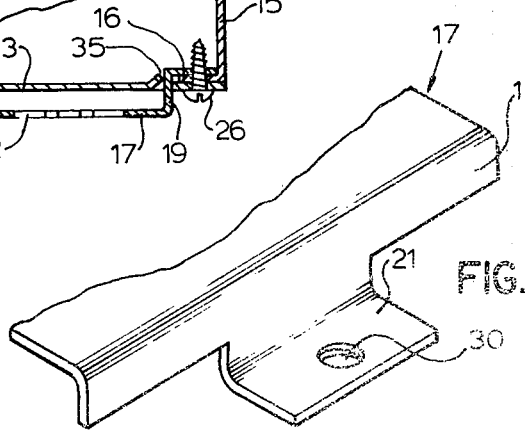
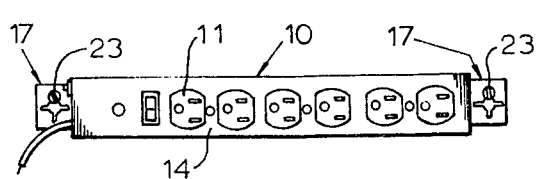
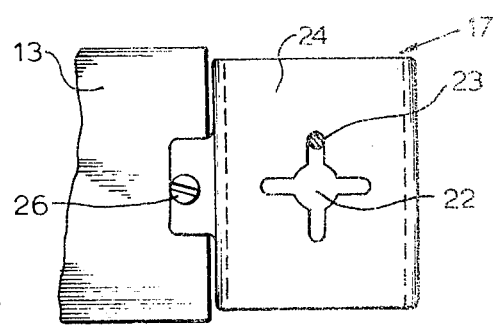

TEMPORARY MOUNTING MEANS FOR MULTIPLE OUTLET STRIP

BACKGROUND OF THE INVENTION

1. Field of the Invention

This invention relates in general to mounting means in particular for electrical housings or other devices.

2. Description of the Prior Art

Various mounting means for housings such as electrical housings are known wherein generally a screw or bolt passes through the back of the housing to attach it to a wall or other mounting surface.

SUMMARY OF THE INVENTION

The present invention relates to a mounting arrangement for a housing such as an electrical housing wherein it becomes impossible to permanently mount the housing to a wall surface due to the construction of the novel fastener of the invention. In an alternate arrangement and position of the fastener of the invention, the housing can be permanently attached to a wall surface.

It is an object of the present invention to provide a novel bracket which passes through the back wall of a housing of an electrical fixture and is formed with a tab which is either threaded or can be tapped with a self-tapping screw so as to lock the bracket and the electrical housing together. The bracket is formed with a four-way mounting slot that can be received over the head of a screw or bolt so as to temporarily attach the housing to a wall surface.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure and in which:

BRIEF DESCRIPTION OF THE DRAWINGS

FIG. 1 is a perspective view of the electrical housing of the invention;

FIG. 2 is a rear view of the housing illustrating a pair of brackets mounted on the back thereof;

FIG. 3 is a sectional view taken on line III—III from FIG. 2;

FIG. 4 is a sectional view illustrating the mounting bracket;

FIG. 5 is a perspective view illustrating the mounting bracket;

FIG. 6 is a partially cut-away view of the bracket showing a modified form of the bracket;

FIG. 7 is a front plan view of the electrical housing showing a modified mounting arrangement; and FIG. 8 is a rear detail view of the embodiment illustrating FIG. 7.

DESCRIPTION OF THE PREFERRED EMBODIMENTS

FIG. 1 illustrates an electrical product 10 comprising a housing 12 with a front panel 14 in which a plurality of power outlets 11 are mounted and which can be activated by an extension cord 31.

FIG. 2 is a back view of the electrical product 10 which has the mounting brackets 17 attached to opposite ends thereof for temporarily mounting the housing 10 to a wall.

FIG. 5 is an enlarged exploded view of the bracket 17 which has a center portion 25 in which a four-way mounting slot 22 is formed for receiving the head of a mounting screw or bolt, for example. Spacer legs 18 and 19 extend down from the portion 25 and a tab 21 extends outwardly from the leg 19 as shown. The tab 21 is formed with a notch or gap 20 for receiving a mounting screw therein.

As shown in FIG. 4, the rear plate 13 of the housing 10 is formed with a slot 35 into which the tab 21 of the bracket 17 can be received. After the tab 21 is inserted into the slot 35, a machine screw 26 is passed through an opening formed in the back panel 13 of the housing 10 and through an opening formed in an extension 16 of the side wall 15 as well as through the notch 20 of the bracket 17. When the screw 26 is tightened the bracket 17 as well as the back cover 13 and the side wall 15 of the housing will be firmly attached to each other. Due to the legs 18 and 19, the four-way mounting slot 22 will be spaced away from the back wall 13 so as to receive the head of a suitable mounting screw 29 therein which can be mounted in the wall 28 as illustrated in FIG. 3. Of course, it is to be realized that both of the mounting brackets 17 are attached to the housing 10 as illustrated in FIG. 2 so that a pair of screws 29 can be passed through the four-way slots 22 to mount the housing on the wall.

FIG. 6 illustrates a modification of the invention wherein the tab 21 is formed with an opening 30 instead of the crescent-shaped opening 20 as in the modification of FIG. 5.

FIGS. 7 and 8 illustrate a modification wherein the tab 21 is attached to the housing 10 so that the housing 10 can be permanently attached to the wall. In this embodiment, the brackets 17 are mounted so that they extend outwardly from the back wall 13 of the housing as illustrated in FIGS. 8 and 7. The screws 26 are still passed through the opening 30 or the slot 20 of the tab 21 of the bracket 17. However, the bracket 17 extends outwardly rather than being mounted on the back of the housing. The housing 10 can then be mounted by passing screws 23 through the four-way mounting slot 22 to attach the unit 10 to the wall.

Although the invention has been described with respect to preferred embodiments, it is not to be so limited as changes and modifications may be made which are within the full intended scope as defined by the appended claims.

I claim as my invention:

1. An apparatus mounting a housing having a planar rear surface to a wall such that it is impossible to lock said housing to the wall so that the housing cannot be moved comprising, a pair of spaced slots formed in said planar rear surface, a pair of locking holes formed in said planar rear surface adjacent said slots, a first bracket formed with a main planar portion formed with a first mounting slot loosely receiving the head of a first mounting screw or bolt which extends from the wall, a first pair of off-setting legs attached to said main portion to space it from the rear of said planar wall of said housing, a first tab with a first locking opening formed therein extending from one of said first pair of legs parallel to said planar rear surface and in the opposite direction thereto, said first tab received in one of said spaced slots in said planar rear surface, a first locking screw or bolt received into one of said locking holes of said planar rear surface and through the opening of said first tab to lock said first tab to the rear panel of said housing such that said first bracket is not visible from the front of said housing, a second bracket formed with a main planar portion formed with a second mounting slot for loosely receiving the head of a second mounting screw or bolt which extends from the wall, a second pair of off-setting legs attached to said main portion to space it from the rear of said planar wall of said housing, a second tab with a second locking opening formed therein extending from one leg of said second pair of legs parallel to said planar rear surface and in the opposite direction thereto, said second tab received in the other of said spaced slots in said planar rear surface, a second locking screw or bolt received into the other of said locking holes of said planar rear surface and through the opening of said second tab to lock said second tab to the rear panel of said housing so that said second bracket is not visible from the front of said housing.

2. A mounting arrangement according to claim 1 wherein said mounting slot in said main portion is cross-shaped.

3. A mounting arrangement according to claim 1 wherein said first locking opening of said first tab is threaded.

4. A mounting arrangement according to claim 1 wherein said first locking opening in said first tab is a gap.

* * * * *